United States Patent
Bolin et al.

(10) Patent No.: US 11,039,400 B2
(45) Date of Patent: Jun. 15, 2021

(54) METHOD FOR PERFORMING RADAR-ASSISTED WIRELESS DATA COMMUNICATION

(71) Applicant: Sony Corporation, Tokyo (JP)

(72) Inventors: Thomas Bolin, Lund (SE); Zhinong Ying, Lund (SE); Erik Bengtsson, Eslov (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/609,268

(22) PCT Filed: May 18, 2017

(86) PCT No.: PCT/EP2017/062003
§ 371 (c)(1),
(2) Date: Oct. 29, 2019

(87) PCT Pub. No.: WO2018/210427
PCT Pub. Date: Nov. 22, 2018

(65) Prior Publication Data
US 2020/0187126 A1 Jun. 11, 2020

(51) Int. Cl.
*H04W 16/14* (2009.01)
*H04W 52/16* (2009.01)
*H04W 52/28* (2009.01)
*G01S 7/02* (2006.01)
*H04B 7/06* (2006.01)

(52) U.S. Cl.
CPC ............. *H04W 52/16* (2013.01); *G01S 7/021* (2013.01); *H04B 7/0695* (2013.01)

(58) Field of Classification Search
CPC ... H04W 52/16; H04W 52/28; H04W 52/282; H04W 52/283; H04W 16/14; H04W 48/04; H04B 7/0695; G01S 7/006; G01S 7/021; G01S 7/411; G01S 13/56; G01S 13/89
See application file for complete search history.

(56) References Cited

U.S. PATENT DOCUMENTS

| | | |
|---|---|---|
| 2007/0173208 A1 | 7/2007 | Nishio et al. |
| 2011/0256884 A1 | 10/2011 | Kazmi |
| 2017/0131398 A1 | 5/2017 | Younis |

FOREIGN PATENT DOCUMENTS

| | | |
|---|---|---|
| EP | 2750457 A1 | 7/2014 |
| GB | 2533966 A | 7/2016 |
| JP | 2006286665 A | 10/2006 |
| JP | 2009081696 A | 3/2009 |

(Continued)

OTHER PUBLICATIONS

International Search Report and Written Opinion from corresponding International Patent Application No. PCT/EP2017/062003, dated Dec. 12, 2017, 13 pages.

(Continued)

*Primary Examiner* — Philip Sobutka
(74) *Attorney, Agent, or Firm* — Tucker Ellis LLP (57) ABSTRACT

A method for performing wireless data communication is disclosed, which uses a first device and a second device, and which comprises the steps of a) transmitting an outgoing radar signal by the first device, b) determining, by the first device, a receive property of an incoming radar signal which is associated with the outgoing radar signal, and c) setting at least one parameter for performing the wireless data communication by the first device based on the receive property of the incoming radar signal.

15 Claims, 10 Drawing Sheets

(56) References Cited

FOREIGN PATENT DOCUMENTS

JP          2011070358  A     4/2011
WO        2005083907  A1    11/2007

OTHER PUBLICATIONS

N. Gonzalez-Prelicic et al.: "Radar aided beam alignment in MmWave V2I communications supporting antenna diversity"; 2016 Information Theory and Applications Workshop (ITA); IEEE; downloaded on Feb. 18, 2021, 10 pages.

METHOD FOR PERFORMING RADAR-ASSISTED WIRELESS DATA COMMUNICATION

TECHNICAL FIELD

The present application generally refers to techniques for performing wireless data communication. In certain embodiments, performing of wireless data communication is based on a radar signal measurement.

BACKGROUND

Electromagnetic waves in the Gigahertz (GHz) frequency range have been employed for various object detection purposes. Such radar techniques have e.g. been used to determine the range, angle, or velocity of objects, such as aircrafts and motor vehicles. The operation range of these radar detection techniques may overlap with the frequency range suggested for the Third Generation Partnership Project (3GPP)—specified 5th generation of mobile networks—also referred to as New Radio (NR)—, which is approximately at 24 GHz to 41 GHz.

As a matter of consequence, and in order to provide for 3GPP 5th generation NR wireless data communication, there is a need to assure coexistence between data communication and radar techniques.

SUMMARY

It is an objective of the present application to provide a method and a respective device for performing wireless data communication using a first device and a second device which may adapt the wireless data communication to the respective local environment.

A method and a device according to the independent claims are provided. Further embodiments are defined in the dependent claims.

According to an embodiment, a method for performing wireless data communication is disclosed. The wireless data communication is between a first device and a second device. The method comprises transmitting an outgoing radar signal by the first device. The method further comprises determining, by the first device, a receive property of an incoming radar signal which is associated with the outgoing radar signal. The method further comprises setting at least one parameter for performing the wireless data communication by the first device based on the receive property of the incoming radar signal.

Such an approach may be based on the finding that such radar probing based on the radar signals is suited to achieve information regarding the local environment of the first device, such as objects positioned in the proximity of the first device. According to the present technique, the first device may use the achieved local environment information to adapt wireless data communication to the present, specific circumstances. Therefore, an improvement of the wireless data communication by taking into account the local circumstances may be achieved. For example, increased transmission reliability may be achieved.

According to another embodiment, a first device is disclosed. The first device is configured to perform wireless data communication with a second device. The first device comprises a control circuitry configured to perform a method. The method comprises transmitting an outgoing radar signal by the first device. The method further comprises, determining, by the first device, a receive property of an incoming radar signal which is associated with the outgoing radar signal. The method further comprises setting at least one parameter for performing the wireless data communication by the first device based on the receive property of the incoming radar signal.

The control circuitry of the device may hence be adapted to perform the above method. For example, the control circuitry may be at least one processor, an application-specific integrated circuit (ASIC), etc.

A device within the meaning of the present may be a user equipment or a base station or a relay. Examples of such a user equipment include a smartphone, a handheld device, a telephone, a laptop, a tablet pc, a smart TV, a Internet of Things (IoT) sensor or actuator, etc.

A radar signal within the meaning of the present disclosure may refer to a signal that is based on electromagnetic radio waves in the frequency range of GHz to THz. Detection of the radar signal by any device may provide information with respect to range, angle or velocity of any object surrounded in the environment of—and relative to—the respective device. This may be referred to as radar probing.

A receive property within the meaning of the present disclosure may refer to any property of an incoming radar signal that may be received by the first device. The receive property may be a property that is detectable by the first device. The receive property may be a physical parameter of the incoming radar signal such as time-of-flight, path loss, Doppler shift, signal level, etc.

In an embodiment of the method, the at least one parameter comprises a transmit power of the wireless data communication. In another embodiment, setting the transmit power effects a reduction of the transmit power, which may be achieved by a) lowering the transmit power to remain below a certain level and/or b) using fewer resources in frequency domain and/or c) using fewer resources in time domain.

Based on such an approach, the power density field strength in the environment of the first device and associated with the wireless data communication may be made dependent upon the presence of an object in the proximity of the first device. Therefore, influencing the object by a high-density field strength may be avoided, while at the same time an effective wireless data communication may be maintained in the absence of such an object.

In another embodiment, the at least one parameter comprises a beam sweep configuration of a beam sweep for determining a spatial propagation path of the wireless data communication. In another embodiment, the at least one parameter comprises the spatial propagation path of the wireless data communication.

A beam sweep configuration within the meaning of the present disclosure may correspond to a multiple sets of antenna weights of a plurality of antennas; by means of a beam sweep, different sets of antenna weights can be used to test the wireless data communication. A set of antenna weights may define amplitudes and phases with which the various antennas contribute to transmission and/or reception of signals. The most suitable set of antenna weights—which defines a corresponding spatial propagation path—may then be used to communicate, e.g., payload data or control data.

The spatial propagation path within the meaning of the present disclosure may correspond to a transmit direction and/or a receive direction. For example, the spatial propagation path may be associated with a set of antenna weights, e.g., transmit antenna weights and/or receive antenna weights.

Using such an approach, the local power density field strength within the beam may be redirected based on the position of the object. Therefore, influencing the object by a high-density field strength may be avoided, while at the same time an effective, redirected wireless data communication may further be maintained.

In another embodiment, the at least one parameter comprises an antenna panel selection.

An antenna panel within the meaning of the present disclosure may refer to a plurality of antennas, which are configured to form the beam sweep configuration. The panel comprising the plurality of antennas may be formed as an antenna array for phased transmission and/or reception using a set of antenna weights.

Thereby, the determined position of the object may be used for the selection of the respective antenna panel—sometimes also referred to antenna array—for configuring a beam sweep. In an embodiment, the selected panel may be employed for a beam sweep. Thus, the panel selection can be performed so that the power density field strength at the object recognized from the incoming radar signal and resulting from the beam sweep may be minimized.

In another embodiment, the method further comprises analyzing a movement profile of an object providing and, e.g., providing reflection of the radar signal, based on the receive property of the incoming radar signal, and setting the at least one parameter in accordance with the analyzed movement profile.

Thereby, determining information of the object may include both a position of the object and a movement of the object. Therefore, evaluation of a prospective positioning of the object may be achieved and a redirection of the beam sweep may be achieved, which further supports avoiding any radiation effects affecting on the object.

In another embodiment, the at least one parameter comprises a frequency value or a frequency range of the wireless data communication.

Based on this approach, the presence of an object in the proximity of the first device may adjust the transmission of a frequency and a frequency range respectively; thereby, frequency-dependent absorption in the object may be reduced.

In another embodiment, the at least one parameter comprises a transmission protocol of the wireless data communication. For example, the transmission protocol may be selected from the group comprising: 3GPP Long Term Evolution and 3GPP NR. For example, different transmission protocols may employ different communication bandwidths, different transmission frame structures, and/or different time-frequency resource mappings, etc.

Based on this approach, a more robust modulation scheme and/or a more robust precoding algorithm may be achieved.

In another embodiment, the receive property comprises the signal level of the incoming radar signal. In other words, adjusting the wireless data communication may be performed based on the magnitude of an incoming radar signal. Since the magnitude of the incoming radar signal may depend on the proximity of the object relative to the first device—or, in other words, the path loss—, the adjustment of the wireless data communication may be performed with respect to the proximity of the object. As an example, power reduction of the wireless data communication can be executed in a stronger manner in case that the distance in between the first device and the object is smaller, wherein power reduction of the wireless data communication can be executed in a weaker manner in case that the distance in between the first device and the object is greater. Therefore, adjusting the wireless data communication may be improved by specifically taking the local environment of the first device into account.

In another embodiment, the receive property comprises at least one of the time delay between reception of the incoming radar signal and transmission of the outgoing radar signal—i.e., time-of-flight—and a Doppler shift of the incoming radar signal if compared to the outgoing radar signal.

With respect to the time delay, adjusting the wireless data communication may be performed based on the respective time delay. Since the time delay may depend on the proximity of the object relative to the first device, the adjustment of the wireless data communication may be performed with respect to the proximity of the object. As an example, power reduction of the wireless data communication can be executed in a stronger manner in case that the distance in between the first device and the object is smaller, wherein power reduction of the wireless data communication can be executed in a weaker manner in case that the distance in between the first device and the object is greater. Therefore, adjusting the wireless data communication may be improved by specifically taking the local environment of the first device into account.

With respect to the Doppler shift, a movement and/or velocity of the determined object may be additionally taken into account for setting the at least one parameter. Therefore, protection of the object against the power density field strength may further be improved.

In another embodiment, the method further comprises performing the wireless data communication in accordance with the at least one parameter, wherein the wireless data communication is from the second device to the first device and/or from the first device to the second device. For example, the wireless data communication may be uplink communication, downlink communication, and/or sidelink communication.

For example, at least one receive parameter and/or at least one transmit parameter for performing the wireless data communication may be set. Thus, the first device performing the radar signal based method above may be a receiving unit for performing wireless data communication. According to the second alternative, he first device performing the radar signal based method above may be a transmitting unit for performing wireless data communication. Adaption of the wireless data communication based on a determined radar signal can therefore be performed using a receiving unit and/or using a transmitting unit. This enables an improved flexibility with respect to performing the method for wireless data communication.

In another embodiment, the wireless data communication and the outgoing radar signal have at least overlapping frequencies.

Based on this approach, transmitting electromagnetic waves for both radar purposes and wireless data communication can be performed using the same technical means. As an example, the same antenna panels comprising a plurality of antennas may be used. Therefore, the method may efficiently operate, namely based on a simple arrangement of a respective device for performing said method, and can be performed in a preferable, simple manner.

In another embodiment, transmitting the outgoing radar signal by the first device and determining the receive property of the incoming radar signal is performed during an interruption of the wireless data communication and/or simultaneously with the wireless data communication. Hence, in other words, time-division duplex techniques may be employed. Alternatively or additionally, frequency-division duplex techniques and/or Code Division Multiple Access (CDMA) may be employed.

In case that the radar signal measurement is performed during an interruption of the wireless data communication, interference between performing of the wireless data communication and radar probing may be reduced.

In case that the radar signal measurement is performed simultaneously with the wireless data communication, wireless data communication may be performed uninterrupted and the adaption by setting the at least one parameter may be in real-time.

In another embodiment, the radar signal is a control signal of the wireless data communication. For example, the radar signal may be a pilot signal or synchronization signal of the wireless data communication. The control signal may have a well-defined signal shape such as symbol sequence and/or signal level.

The above summary is merely intended to give a short overview over some features of some embodiments and implementations and is not to be construed as limiting. Other embodiments may comprise other features than the ones explained above.

BRIEF DESCRIPTION OF THE DRAWINGS

The above and other elements, features, steps and characteristics of the present disclosure will be more apparent from the following detailed description of embodiments with reference to the following figures.

DETAILED DESCRIPTION OF THE DRAWINGS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings, which are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wireless communication in a network are disclosed. For example, the network may be a cellular network comprising multiple cells, wherein each cell is defined by one or more BSs. Example network architectures include the 3GPP LTE architecture. According to 3GPP LTE, a wireless channel is defined according to the evolved UMTS Terrestrial Radio Access (EUTRAN). Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. In particular, such techniques may be applied in 3GPP NB-IoT or eMTC networks and 3GPP New Radio (NR) networks. Furthermore, respective techniques may be readily applied to various kinds of non-3GPP-specified architectures, such as Bluetooth, satellite communication, IEEE 802.11x Wi-Fi technology, etc.

The techniques disclosed herein may facilitate determining of at least one parameter of a wireless data communication. In the various examples, various kinds and types of parameters may be determined, e.g., a transmit power, a spatial propagation path that may be implemented by antenna weights, or a beam sweep configuration of a beam sweep for determining a spatial propagation path.

According to the techniques disclosed herein, the at least one parameter may be determined based on radar probing. An incoming radar signal associated with an outgoing radar signal may be received and, based on a receive property, the at least one parameter may be determined.

Figure 1:
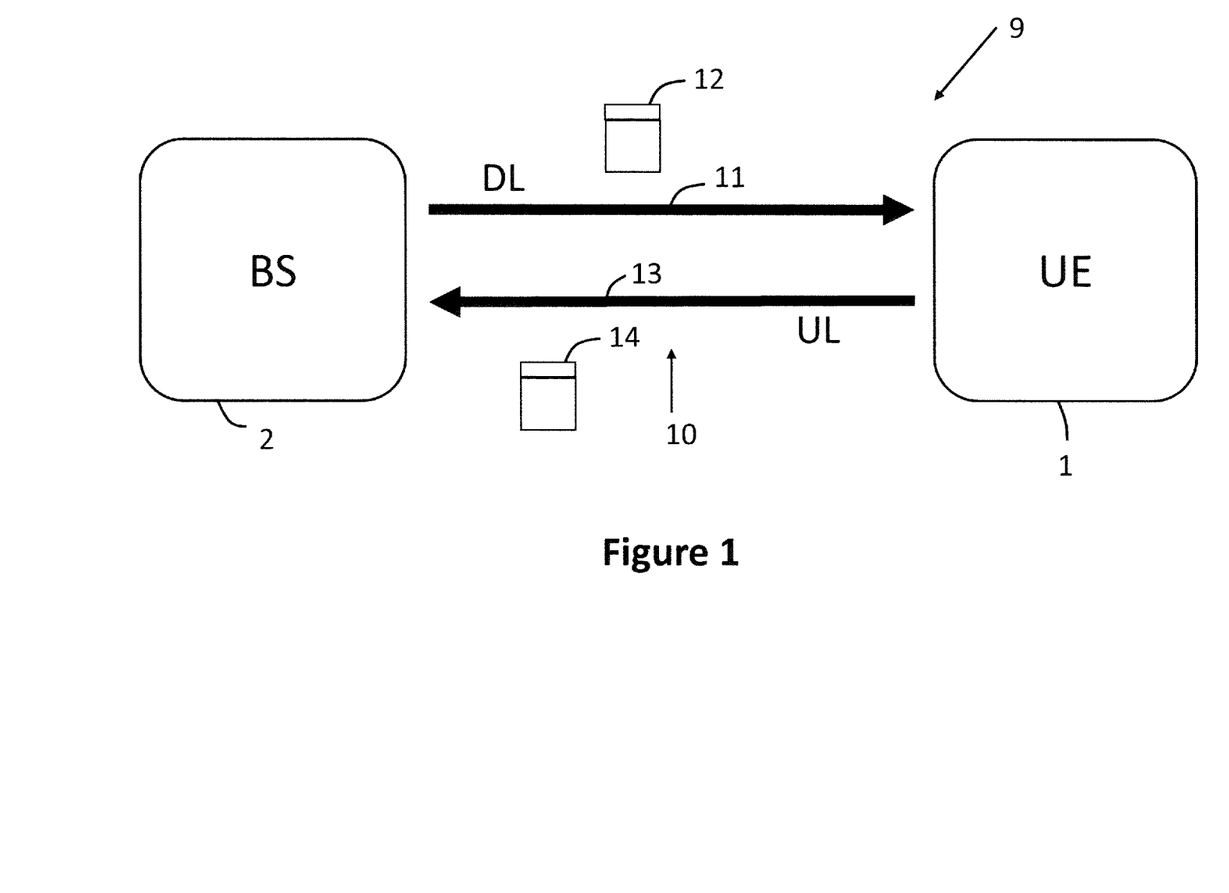
FIG. 1 schematically illustrates a network performing wireless data communication between a base station and a user equipment UE according to various examples.

FIG. 1 schematically illustrates a wireless communication network 9 for performing wireless data communication that may benefit from the techniques disclosed herein. The network 9 may be a 3GPP-standardized network such as 3G, 4G, or upcoming 5G. Other examples include point-to-point networks such as Institute of Electrical and Electronics Engineers (IEEE)-specified networks, e.g., the 802.11x Wi-Fi protocol or the Bluetooth protocol. Further examples include 3GPP NB-IOT or eMTC networks.

The wireless communication network 9 for wireless data communication includes a first device 1, which may be configured as a user equipment (UE) 1 or as a base station (BS) 1, and a second device 2, which may be configured as a base station (BS) 2 or as a user equipment (UE) 2. As an example, such a UE might be one of the following: a smartphone; a cellular phone; a table; a notebook; a computer; a smart television; a Machine Type Communication (MTC) device; an enhance MTC (eMTC) device; an Internet of Things (IoT) device; a Narrowband IOT (NB-IoT) device; a sensor; an actuator; etc. BS might also be one of the following: a Node-B (NB); an evolved Node-B (e-NB); a gNB as in NR; etc.

A wireless data link 10 provided for wireless data communication is established between the UE 1 and the BS 2. The wireless data link 10 may implement a downlink (DL) data channel 11. The DL data channel 11 can be used for transmitting downlink (DL) data 12 from the BS 2 towards the UE 1. The wireless data link 10 may also implement an uplink (UL) data channel 13 for transmitting uplink (UL) data 14 from the UE 1 towards the BS 2. However, according to another embodiment, communication may also be established between a) a UE 1 and a UE 2 or b) a BS 1 and a BS 2.

Figure 2:
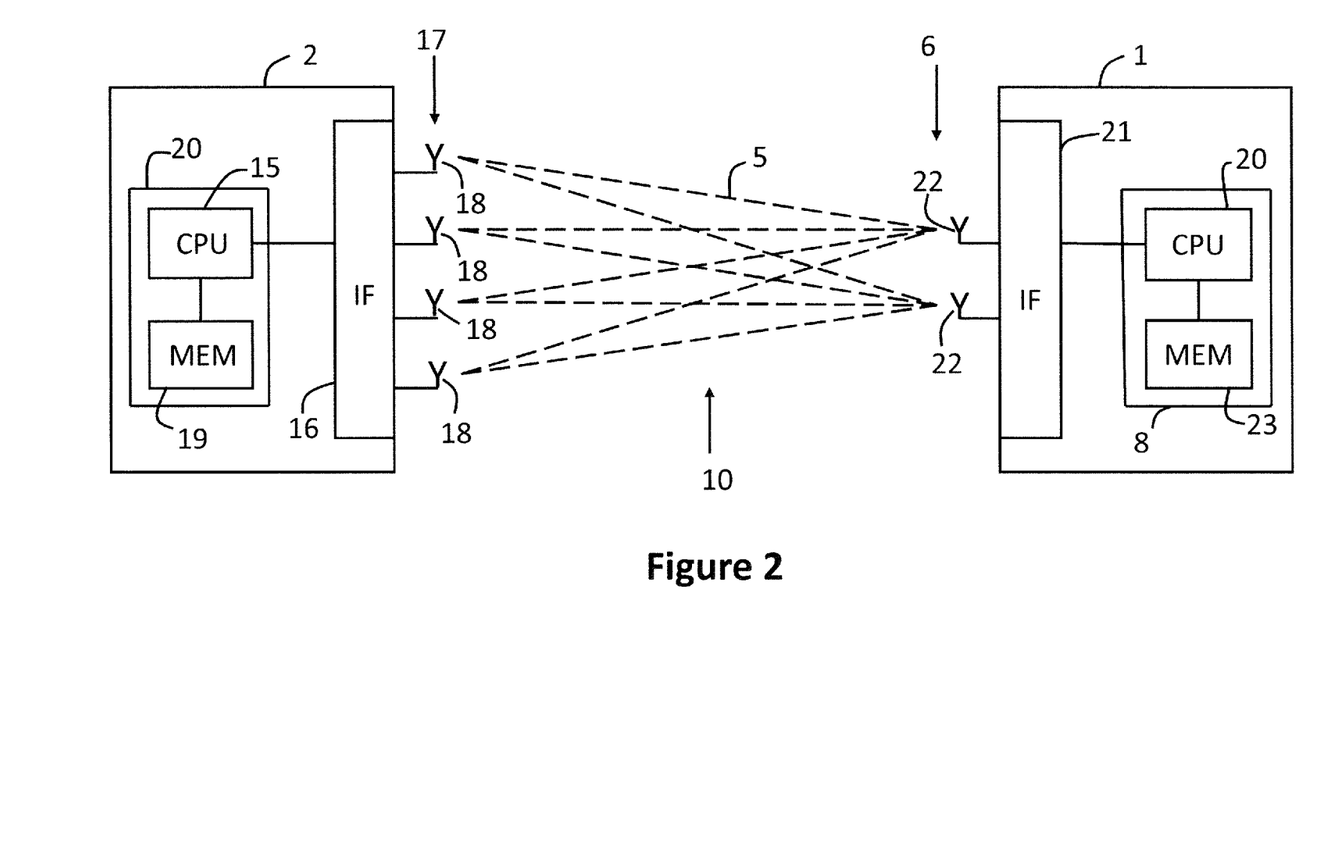
FIG. 2 schematically illustrates the base station and the user equipment UE in greater detail according to various examples.

FIG. 2 schematically illustrates the BS 2 and the UE 1 in greater detail. The BS 2 includes a processor 15 and an interface 16, sometimes also referred to as frontend. The interface 16 is coupled via antenna ports with an antenna panel 17 (panel, hereinafter) including a plurality of antennas 18. Although FIG. 2 merely depicts one panel 17, the BS 2 may comprise a plurality of such panels 17, each coupled with the interface 16. Each antenna 18 may include one or more electrical traces to carry a radio frequency current. Each antenna 18 may include one or more LC-oscillators implemented by the electrical traces. Each trace may radiate electromagnetic waves with a certain beam pattern.

The BS 2 further includes a memory 19, e.g., a non-volatile memory 19. The memory 19 may store program code that can be executed by the processor 15. Executing the program code may cause the processor 15 to perform techniques with respect to the determination of a beam configuration as disclosed herein. Thus, the processor 15 and the memory 19 form a control circuitry 20.

The UE 1 includes a processor 20 and an interface 21, sometimes also referred to as frontend. The interface 21 is coupled via antenna ports (not shown in FIG. 2) with a panel 6 including a plurality of antennas 22. Although FIG. 2 merely depicts one panel 6, the UE 1 may comprise a plurality of such panels 6a-6e, each coupled with the interface 21. Each antenna 22 may include one or more electrical traces to carry a radio frequency current. Each antenna 22 may include one or more LC-oscillators implemented by the electrical traces. Each trace may radiate electromagnetic waves with a certain beam pattern.

The UE 1 further includes a memory 23, e.g., a non-volatile memory 23. The memory 23 may store program code that can be executed by the processor 20. Executing the program code may cause the processor 20 to perform techniques with respect to the determination of a beam configuration as described herein. Thus, the processor 20 and the memory 23 form a control circuitry 8.

FIG. 2 also illustrates aspects with respect to spatial propagation paths 5. FIG. 2 schematically illustrates that different spatial propagation paths 5 (dashed lines in FIG. 2) are implemented on the wireless data link 10. The different spatial propagation paths 5 are associated with different beam configurations. For example, to implement a certain spatial propagation path 5 for DL data communication, a certain DL transmit beam configuration may be selected for the panel 17 of the BS 2. Here, the beam configurations may generally be implemented by certain set of antenna weights of the antennas 18, 22 of the respective panel 6, 17 and the respective plurality of panels 6a-6e, 17, respectively. Sometimes, the set of antenna weights are also referred to as steering vector. Accordingly, different beam configurations may be obtained by using different amplitude and phase configurations for the various antennas 178, 22 of the respective panel 6, 17 and the respective plurality of panels 6a-6e, 17, respectively. Generally, beam configurations may be applied for transmission (transmit beam configurations) and/or reception (receive beam configurations). Furthermore, generally, beam configurations may be applied for DL data communication (DL beam configurations) and/or UL data communication (UL beam configurations).

Different ones of the spatial propagation paths 5 may have different transmission characteristics such as number of reflections, path loss, and generally transmission reliability and/or capacity. In particular, different spatial propagation paths 5 can have different fading profiles at the position of the respective receiver. Fading typically occurs due to destructive interference of reflected electromagnetic waves carrying the signals at the position of the receiver. By using appropriate spatial propagation paths 5, diversity can be provided to reduce fading. According to various examples described herein, selection of the appropriate spatial propagation path 5 is facilitated.

Figure 3:
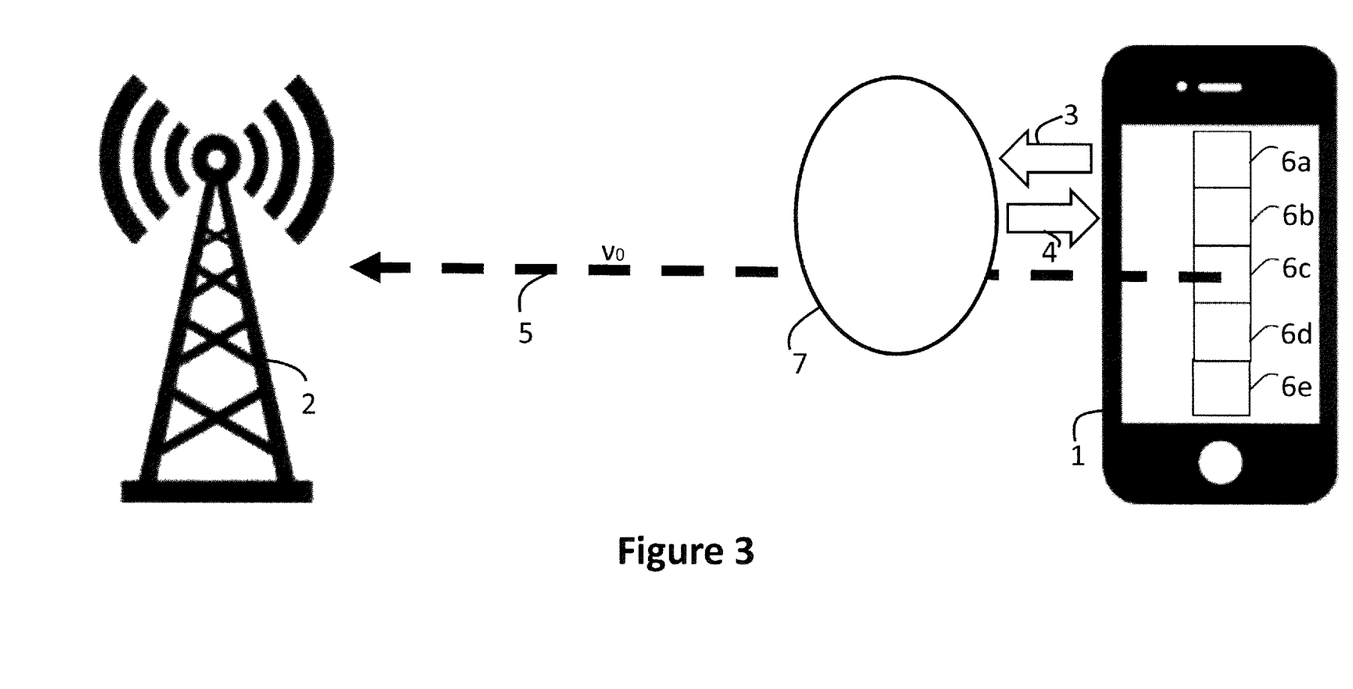
FIG. 3 schematically illustrates an uplink data communication according to the disclosure, wherein the user equipment UE is in proximity of an object.

FIG. 3 schematically illustrates an uplink data communication according to a situation in which the method according to the present disclosure may be helpful. Herein, the UE 1 is in proximity of an object 7. The UE 1 comprises a plurality of panels 6a to 6e, each adapted for the provision of multiple spatial propagation paths 5, along which an electromagnetic wave for data transmission, comprising a frequency range or frequency—such as frequency $v_0$ —may propagate (in FIG. 3 only a single spatial propagation path of panel 6c is illustrated for sake of simplicity).

Depending on the local environment of the UE 1, according to the method of the present disclosure, the wireless data communication is adjusted; here at least one parameter is set. To set the parameter, the UE 1 performing wireless data communication to the BS 2 may additionally perform radar measurements. According to the present disclosure, this radar measurement may be performed simultaneously with the wireless data communication and/or may be performed during an interruption of the wireless data communication. Hence, the radar signal may be transmitted by the same panels 6a to 6e, which are also used for performing wireless data communication. The radar signal may also be configured as a control signal of the wireless data communication, e.g., a pilot signal and/or a synchronization signal and/or a sounding reference signal (SRS) or other 3GPP related sounding signals. The outgoing radar signal 3 transmitted by any of the panels 6a to 6e or transmitted by a plurality of panels 6a to 6e may have at least overlapping frequencies with the wireless data communication. It is also intended that the outgoing radar signal 3 has the same frequencies than the wireless data communication.

The outgoing radar signal 3 may interact with the object 7, which may consequently result in a scattering process of the radar signal and/or in a reflection of the radar signal. In case that the outgoing radar signal 3 is reflected, when interfering with the object 7, the reflected radar signal, depicted as incoming radar signal 4 in FIG. 3, arrives at the UE1. The incoming radar signal 4 may then be received by at least one panel 6a to 6e of the plurality of panels 6a to 6e. At least one panel 6a to 6e receiving the incoming radar signal 4 may be identical with at least one panel 6a to 6e transmitting the respective outgoing radar signal 3. However, it is also intended that any panel 6a to 6e receiving the incoming radar signal 4 is identical with the panels 6a to 6e transmitting the respective outgoing radar signal 3. The incoming radar signal 4 received by at least one of panels 6a to 6e may then be processed by the processor 20 of the UE 1. Based on this processing, adjusting the wireless data communication based on the local environment of the UE 1, such as the presence of object 7, may be achieved.

Figure 4:
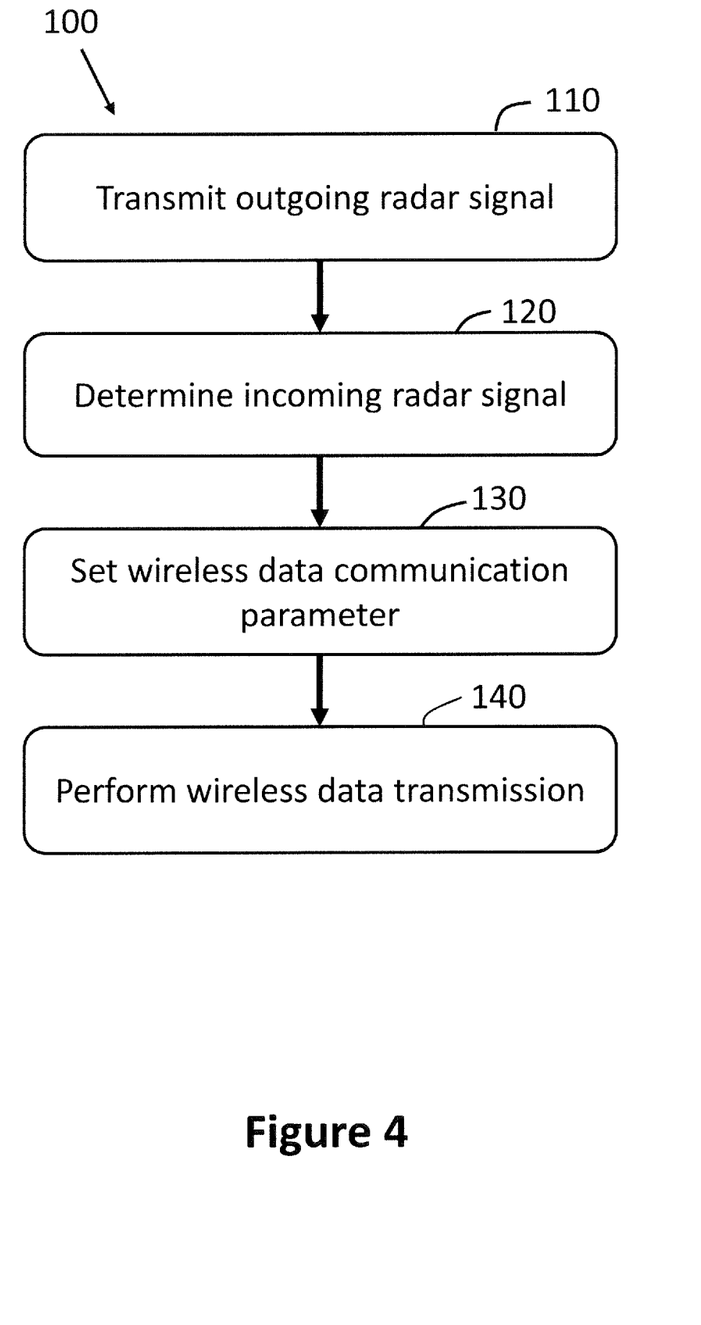
FIG. 4 represents a flowchart of a method performed by the user equipment UE according to various examples.

FIG. 4 represents a flowchart of a method 100 performed by the user equipment UE 1 according to various examples. As an example, the method 100 according to FIG. 4 may be performed in the environment depicted in FIG. 3. The method 100 is for adjusting wireless data communication from the UE1 to the BS 2 based on the local environment of the UE1, wherein information regarding the local environment is obtained by using the radar measurement. Before starting the method 100, it is possible that wireless data communication from the UE 1 to the BS 2 has already been performed. However, it is also possible that wireless data communication from the UE 1 to the BS 2 has not already been formed, yet.

In case that it is intended to perform a wireless data communication from the UE 1 to the BS 2 performed as an adjusted transmission according to the local environment of the UE 1, the method 100 may be initialized. According to the method 100, the UE 1 may then transmit 110 and outgoing radar signal 3. The outgoing radar signal 3 is for investigating the local environment of the UE 1 using radar probing. In case that the outgoing radar signal 3 arrives at an object 7, such as the object 7 according to FIG. 3, the outgoing radar signal 3 may interfere with the object 7, consequently resulting in a reflected radar signal. Such a reflected radar signal, depicted in FIG. 3 as an incoming radar signal 4, may again attain to the user equipment 1.

Subsequently, the method 100 according to the present disclosure provides for determining 120 the incoming radar signal 4. In this context, the UE 1 may determine a receive property of the incoming radar signal 4. The incoming radar signal 4 may be associated with the outgoing radar signal 3, wherein such an association may refer to a reflection or to a scattering process at the object 7. Determination of the receive property may refer to characteristics of the incoming radar signal 4, wherein such a characteristic of the incoming radar signal 4 is indicative with respect to the local environment of the UE 1. As an example, such a receive property may comprise the signal level of the incoming radar signal 4, which may correspond to the distance in between the object 7 and the UE 1 and/or may correspond to the size of object 7.

Additionally or alternatively, the receive property may also comprise a time delay between the reception of the incoming radar signal 4 and the transmission of the outgoing radar signal 3. Due to the constant propagation speed of electromagnetic radio waves in a medium comprising a constant refractive index, such as an air medium, the time delay between the reception of the incoming radar signal 4 and the transmission of the outgoing radar signal 3 may be indicative for the distance between the detected object 7—such as the object 7 depicted in FIG. 3—and the UE 1.

Additionally or alternatively, the receive property may also comprise a Doppler shift of the incoming radar signal 4. As explained in detail below, the Doppler shift refers to a frequency shift in between the outgoing radar signal 3 and the incoming radar signal 4, which might be indicative for the speed value and speed direction that refers to a movement of such an object 7 relative to the UE 1.

After determining the receive property of the incoming radar signal 4, the method 100 may subsequently set 130 at least one parameter for performing the wireless data communication by the UE 1 based on the receive property of the incoming radar signal 4. Since the receive property of the incoming radar signal 4 may be indicative of the local environment of the UE 1 as explained above, setting the at least one parameter may take the local environment of the UE 1 into account. As an example, setting the at least one parameter may take the absence or the presence of an object 7, as derived from the radar probing, into account. In addition, the at least one parameter may take the distance in between the object 7 and the UE 1 into account.

The at least one parameter, which is set for performing the wireless data communication based on the receive power of the incoming radar signal 4, may comprise transmit power of the wireless data communication. As an example, in case that the receive property indicates the presence of an object 7, the transmit power for performing the wireless data communication may be held below a threshold. In addition, the magnitude of reducing the transmit power may depend on the distance of the object 7 and the UE 1.

Additionally or alternatively, the at least one parameter, which is set for performing the wireless data communication based on the receive power of the incoming radar signal 4, may also comprise a beam sweep configuration of the beam sweep 5 for determining a spatial propagation path of the wireless data communication and/or may comprise the spatial propagation path of the wireless data communication. In this context, the receive property may be indicative for the position of the object 7 and the at least one parameter may be set, resulting in a modified spatial propagation path of the wireless data communication. Therefore, in case that an object is detected in a specific position, the affection of the modified beam sweep 5 onto the object 7 can be avoided or can at least be reduced.

Additionally or alternatively, the at least one parameter, which is set for performing the wireless data communication based on the receive power of the incoming radar signal 4, may also comprise a selection of a panel 6a-6e. In this context, the receive property may be indicative for the position of the object 7 and the at least one parameter may be set, resulting in a modified transmission source of the wireless data communication by the selected panel 6a-6e, which again results in a modified spatial propagation path of the wireless data communication. Therefore, in case that an object 7 is detected in a specific position, interaction between the signals of the modified beam sweep 5 and the object 7 can be tailored.

Further, the at least one parameter may also comprise a transmission protocol of the wireless data communication. According to an embodiment, the transmission protocol may be defined by a more robust modulation scheme and/or a more robust precoding algorithm may be achieved.

Additionally or alternatively, the at least one parameter may also comprise a frequency value $v_{set}$ or a frequency value range $\Delta v_{set}$ of the wireless data communication. Therefore, based on the local environment of the UE 1, for which the receive property is indicated, the frequency and a frequency range, respectively of the wireless data communication to performed may be modified in the presence of the object 7 to a specific frequency value $v_{set}$ or to specific frequency range $\Delta v_{set}$, with lower power as integrated over time and bandwidth.

Additionally, setting the at least one parameter may also take a movement profile of the object 7 into account, wherein the receive property may be indicative of such a movement profile.

In a subsequent step, the method 100 may perform wireless data communication 140 in accordance with the at least one parameter. Therefore, the method 100 takes the local environment of UE 1 in account so as to performing the wireless data communication is adjusted by setting the at least one parameter.

FIGS. 5a-5d schematically illustrate the uplink data communication in proximity of the object according to FIG. 3, wherein the at least one parameter is set.

Figure 5A:
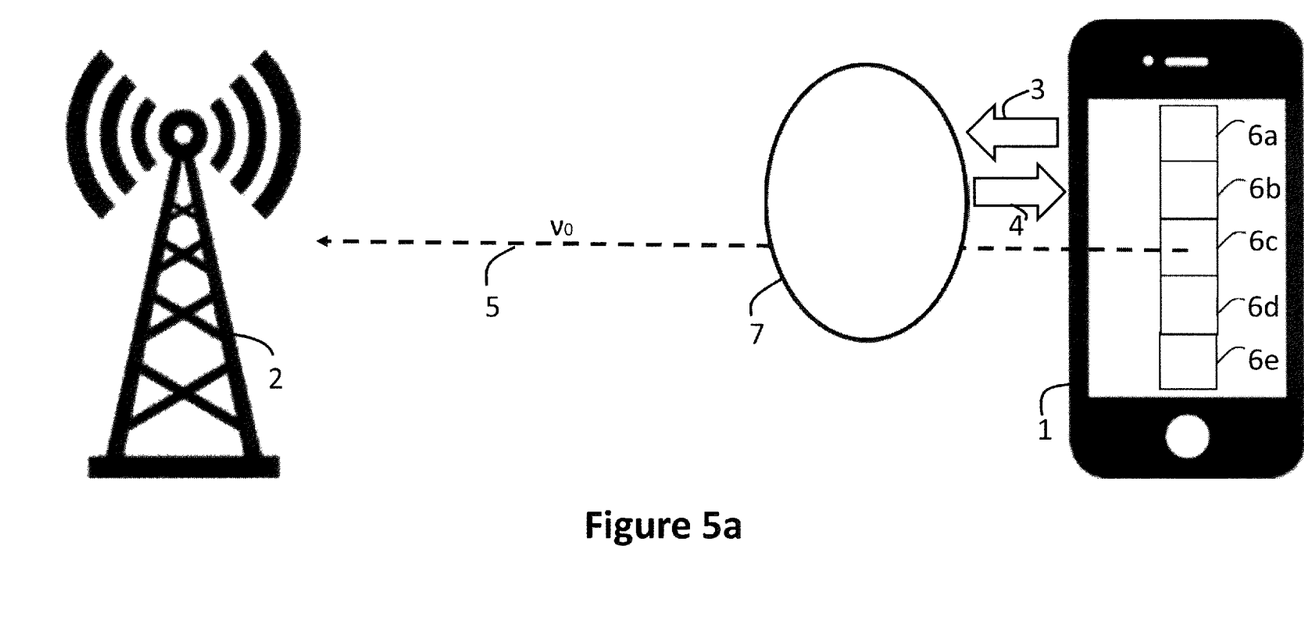
FIGS. 5*a*-5*d* schematically illustrate the uplink data communication in proximity of the object according to FIG. 3, wherein the at least one parameter is set.

FIG. 5a refers to an embodiment of the present disclosure, wherein the at least one parameter is a transmit power of the wireless data communication. Based on the presence of the object 7 identified from radar probing, the transmit power of the wireless data communication is reduced. Comparing to FIG. 3, this is illustrated in FIG. 5a using a weaker representation arrow of the beam sweep 5.

Figure 5B:
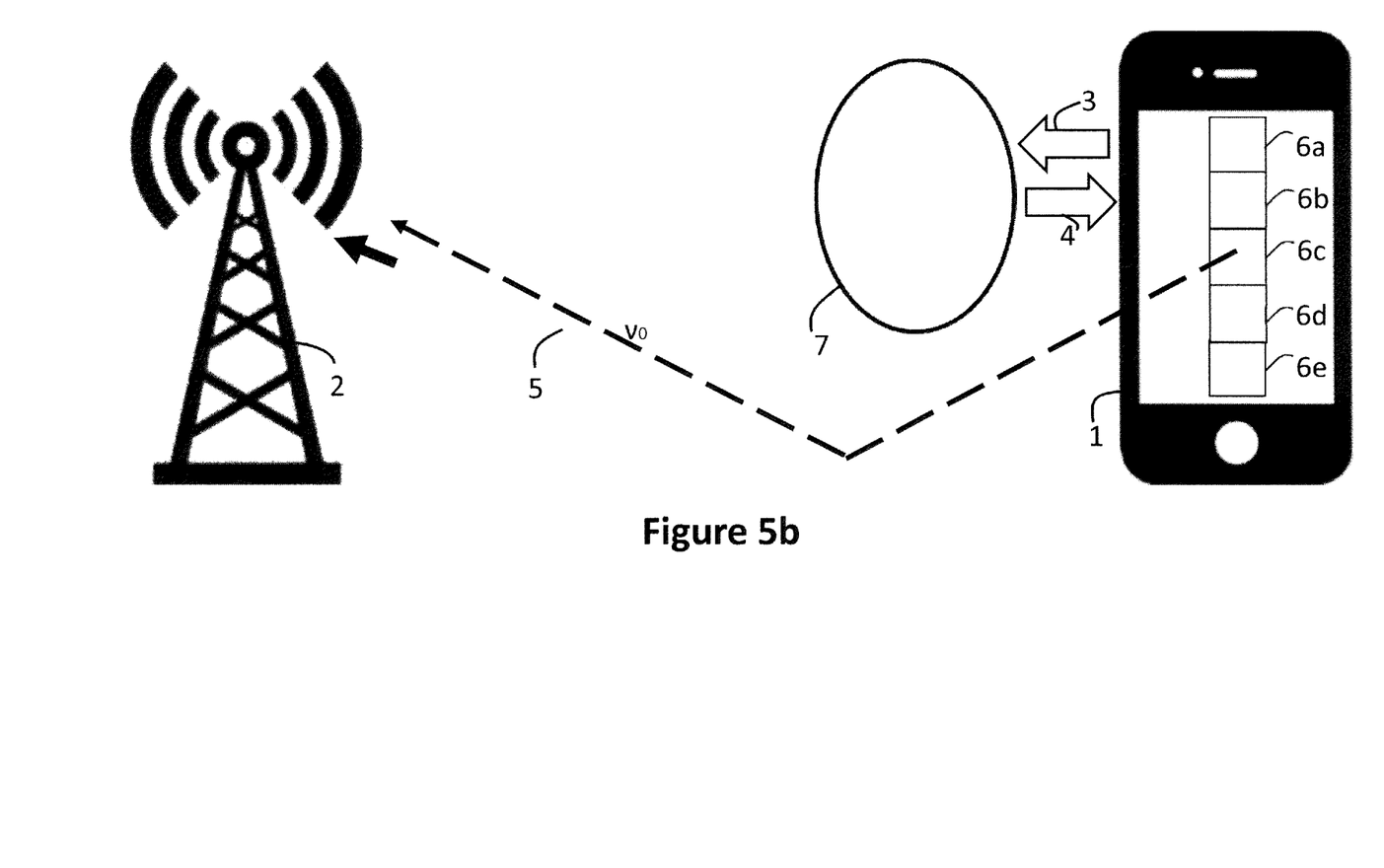

FIG. 5b refers to an embodiment of the present disclosure, wherein the spatial propagation path of the wireless data communication is modified. Compared to FIG. 3, this is illustrated in FIG. 5b using a trajectory of spatial propagation path 5 is chosen which avoids the object 7 by making use of a reflection at another object (not illustrated in FIG. 5). Such a situation may be achieved by setting the at least one parameter, wherein said parameter refers to a beam sweep configuration of a beam sweep for determining a spatial propagation path of the wireless data communication, or wherein said parameter directly comprises the spatial propagation path of the wireless data communication.

Figure 5C:
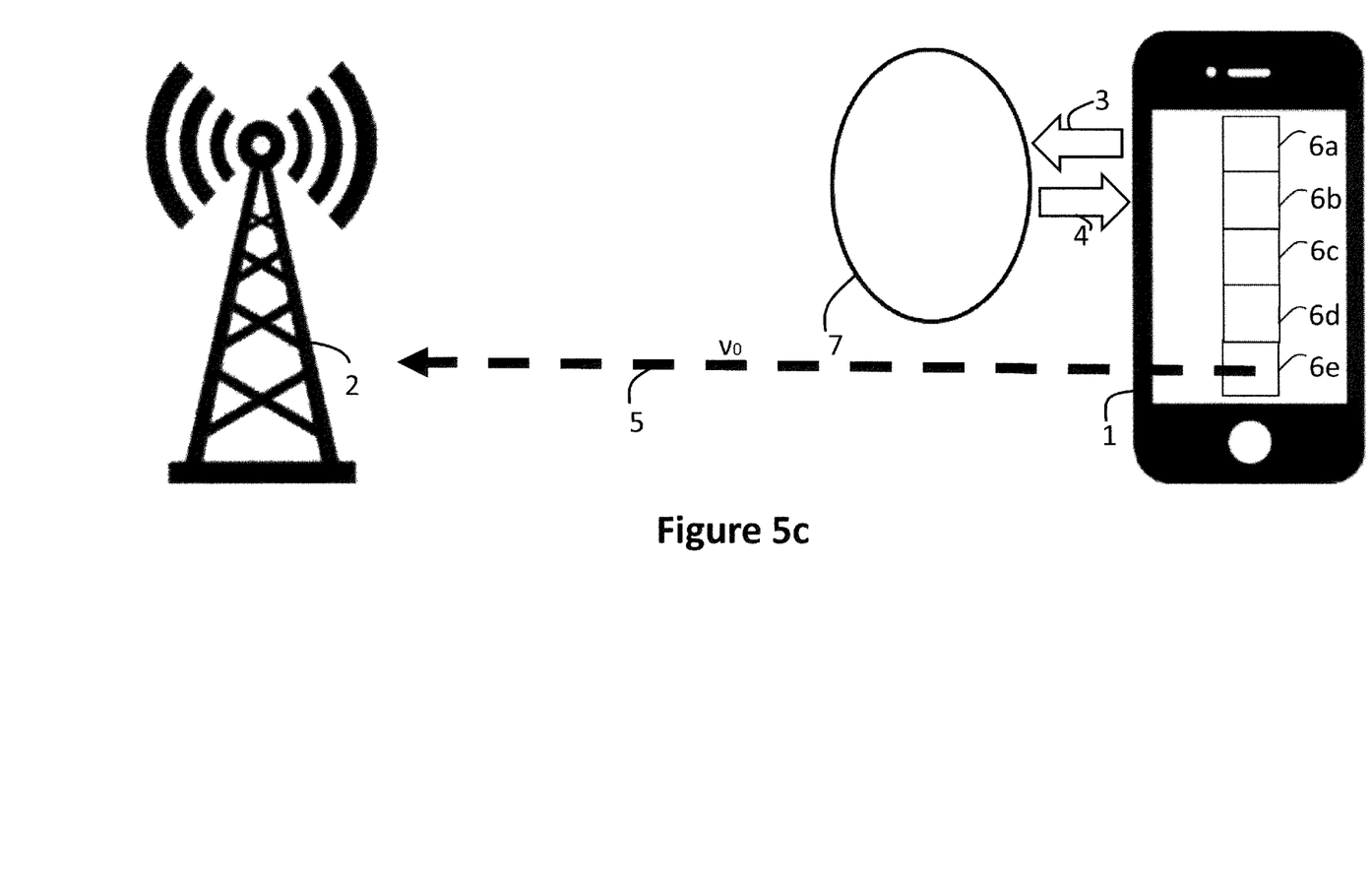

FIG. 5c refers to an embodiment of the present disclosure, wherein the at least one parameter refers to a selection of a panel 6a to 6e, wherein each panel 6a to 6e provides for a beam sweep configuration. Compared to FIG. 3, in which for transmitting wireless data panel 6c is in the present use, FIG. 5c illustrates—for performing wireless data communication—the use of panel 6e instead of panel 6c. Therefore, according to the example depicted in FIG. 5c, the set parameter refers to the selection of panel 6e. As can be deduced from FIG. 5c, in particular when comparing FIG. 5c and FIG. 3, such a panel selection may achieve a spatial propagation path 5, which may exhibit—due to its redirection—less interaction with the object 7.

Figure 5D:
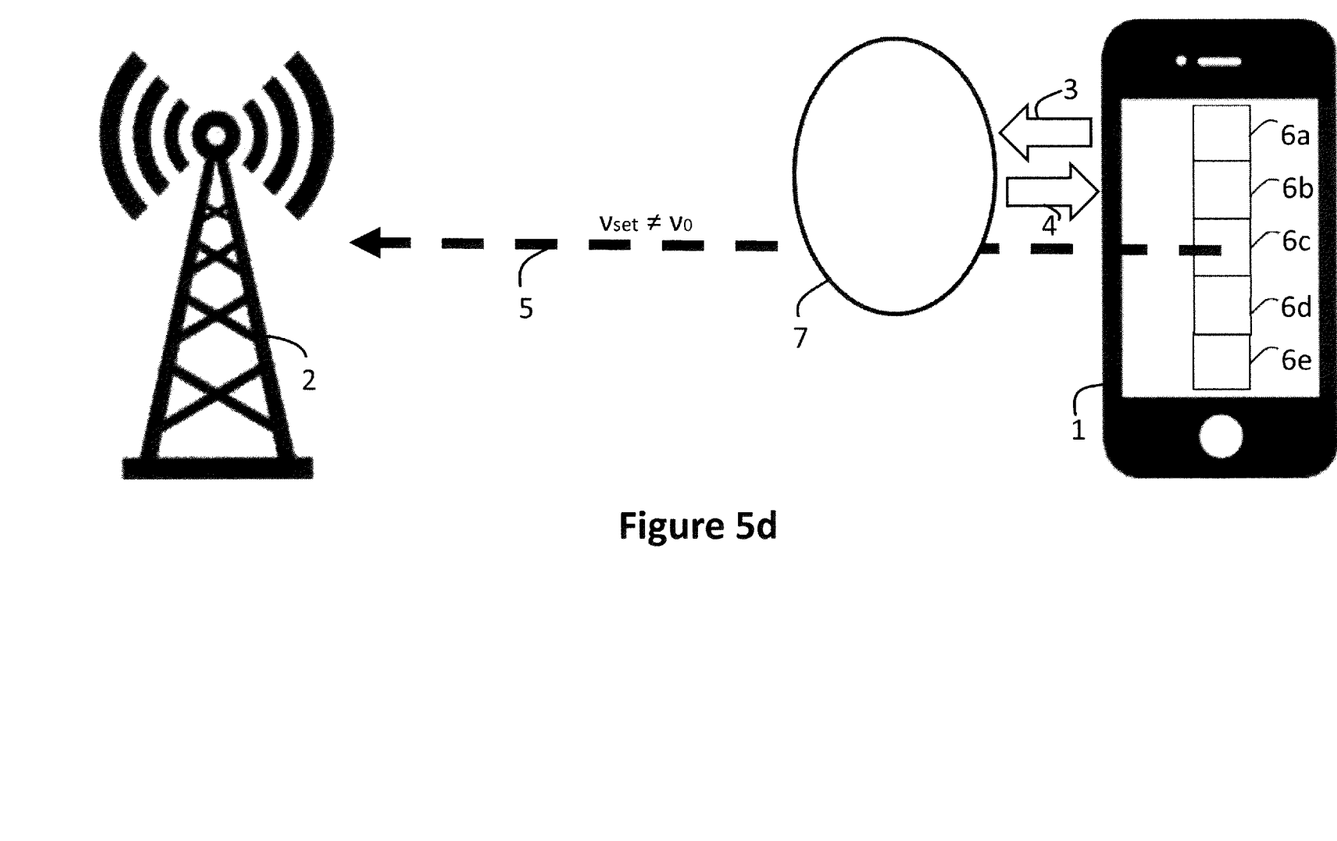

FIG. 5d refers to an embodiment of the present disclosure, wherein the at least one parameter refers to a frequency value or to a frequency range of the wireless data communication. Compared to FIG. 3, this is illustrated in FIG. 5d, wherein data transmission along beam sweep 5 refers to a frequency $v_{set} \neq v_0$. Such a frequency $v_{set}$ may be set based on the receive property of the incoming radar signal 4 carrying information regarding the presence of the object 7 in the local environment of the UE 1.

Figure 6:
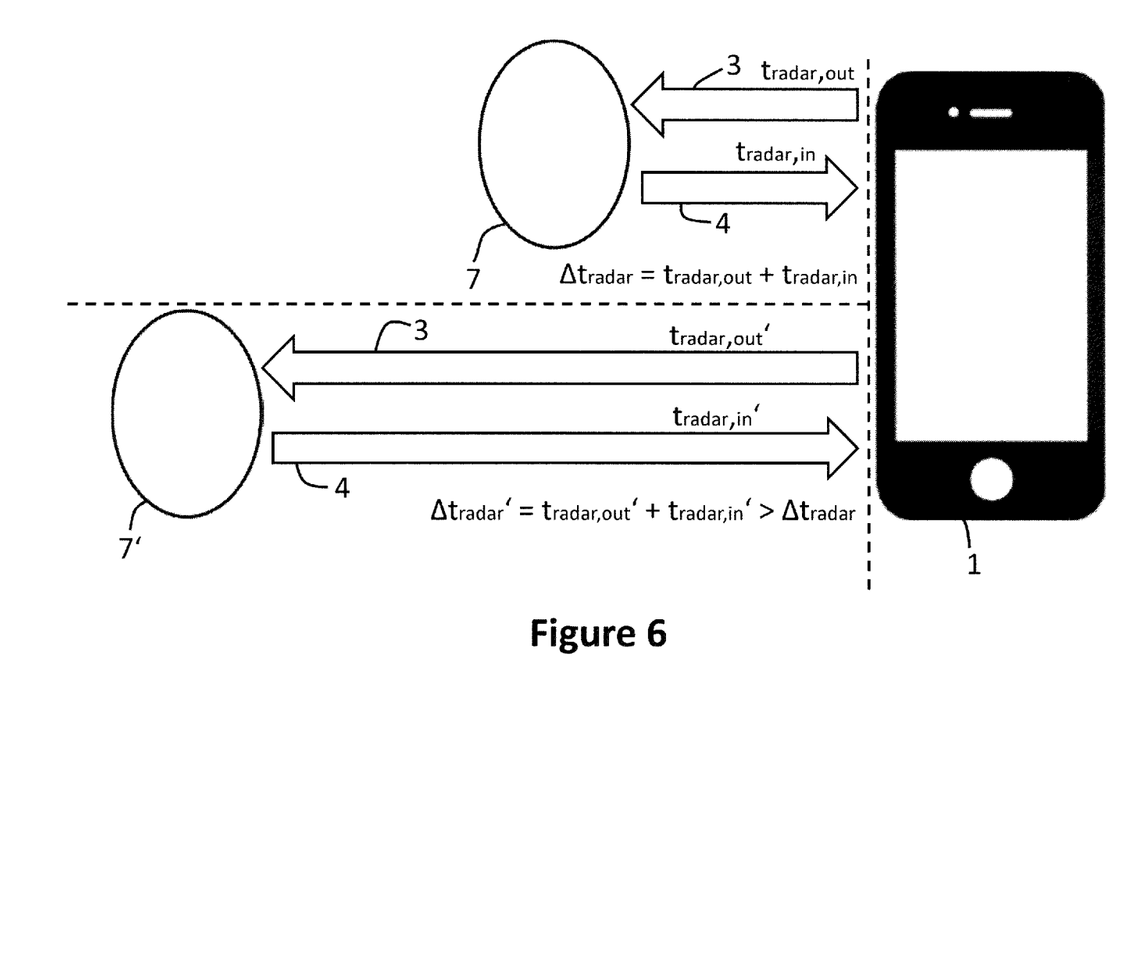
FIGS. 6 schematically illustrates a technique for determining a receive property according to an embodiment.

FIG. 6 schematically illustrates a technique for determining a receive property according to an embodiment. According to the embodiment of FIG. 6, the receive property refers to the time delay between the reception of the incoming radar signal 3 and the transmission of the outgoing radar signal 4. The magnitude of said time delay corresponds to the distance between the object 7, 7' and the UE 1. According to FIG. 6, a first situation, in which the object 7 is in comparatively close proximity to the UE 1, is depicted above and a second situation, in which the object 7' is in comparatively less close proximity to the UE 1, is depicted below.

With respect to the situation above, a time $t_{radar,out}$ corresponds to the outgoing radar signal 3 and a time $t_{radar,in}$ corresponds to the incoming radar signal 4. Assuming that the propagation of the radar signal is in air, the speed of both the outgoing radar signal 3 and the incoming radar signal 4 corresponds to the velocity of light. Further, the time delay between reception of the incoming radar signal 4 and the transmission of the outgoing radar signal 3 is $\Delta t_{radar} = t_{radar,out} \, t_{radar,in}$.

With respect to the situation below, a time $t_{radar,out}'$ corresponds to the outgoing radar signal 3 and a time $t_{radar,in}'$ corresponds to the incoming radar signal 4. Assuming that the propagation of the radar signal is again in air, the speed of both the outgoing radar signal 3 and the incoming radar signal 4 corresponds to the velocity of light. Further, the time delay between reception of the incoming radar signal 4 and the transmission of the outgoing radar signal 3 is $\Delta t_{radar}' = t_{radar,out}' + t_{radar,in}'$. Based on the distance in between the UE 1 and object 7' compared to the distance in between UE 1 and object 7, and based on the same speed of the radar signal in both cases, it may be deduced that $\Delta t_{radar}' > \Delta t_{radar}$.

Figure 7:
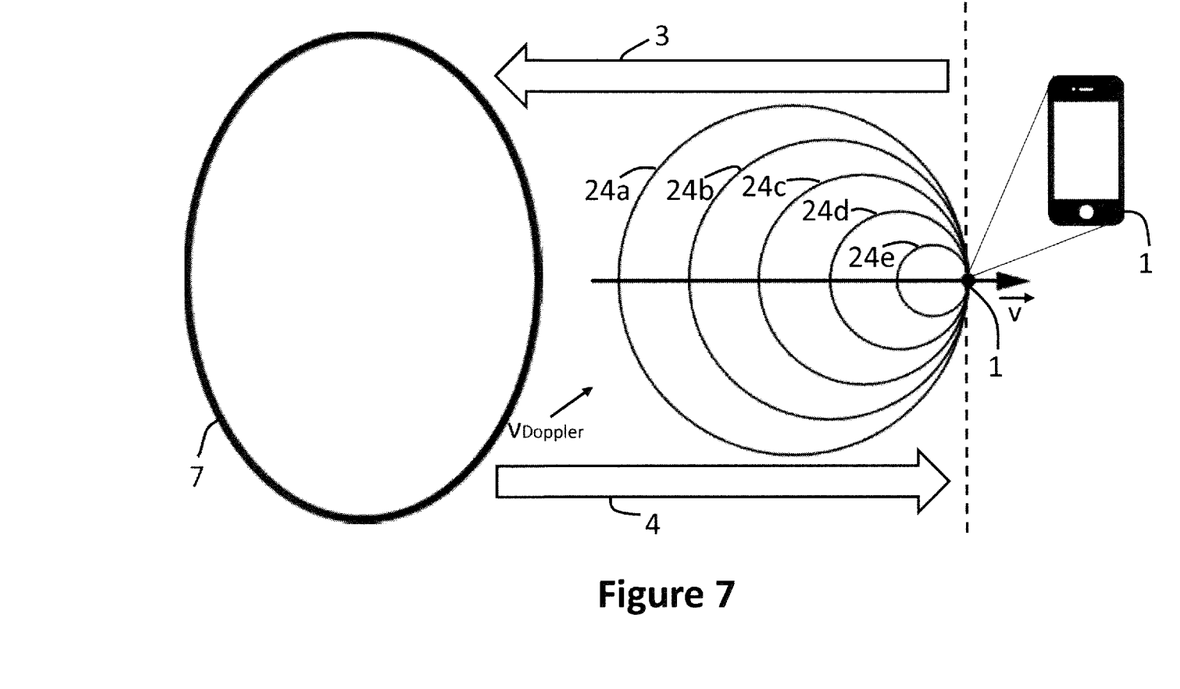
FIGS. 7 schematically illustrates a further technique for determining a receive property according to another embodiment.

FIG. 7 schematically illustrates a technique for determining a receive property according to another embodiment. According to the embodiment of FIG. 7, the receive property refers to the Doppler shift in terms of frequency of the incoming radar signal 4 vis-à-vis the outgoing radar signal 3. Such a frequency shift corresponds to a relative movement in between the object 7 and the UE 1, as can be deduced from FIG. 7. Based on such a relative movement, prospective positions of the object r 7 relative to the UE 1 may be evaluated.

According to FIG. 7 and as explained above, an outgoing radar signal 3 may be transmitted by the UE 1, may be reflected by the object 7, and the corresponding incoming radar signal may be received by the UE1. In the present case, however, UE1 is additionally moving with a constant speed $\overline{v}$. The distance of the wave fronts 24a to 24e is therefore modified by the movement of the UE1, which consequently causes the so-called Doppler shift in between $v_{Doppler}$ in between the frequency of the outgoing radar signal 3 and the frequency of the incoming radar signal 4. Therefore, such a frequency shift $v_{Doppler}$ is indicative of a movement of the UE 1 relative to the object 7.

According to further embodiments (not depicted) of method 100—performed by the first device 1—according to the present disclosure, performing 140 the wireless data communication may occur in different ways. According to such embodiments, it is also possible that the first device 1 is a first user equipment ($UE_A$) 1 and the second device 2 is a second user equipment ($UE_B$) 2. In such a case, wireless data communication may be from the $UE_B$ 2 to the $UE_A$ 1 and/or from the $UE_A$ 1 the $UE_B$ 2. In other words, the method 100 for performing wireless data communication, which may be used to adjust wireless data communication based on setting the at least one parameter may be performed by the $UE_A$ 1, which is a transmitting unit for performing wireless data communication, or may be performed by the $UE_A$ 1, which is a receiving unit for performing wireless data communication. Hence, while with respect to the Figures setting of a transmit parameter of the wireless data communication has been described, generally, a receive parameter of the wireless data communication may be set alternatively or additionally.

Further, generally, while with respect to the Figures setting of a parameter of uplink wireless data communication has been discussed, it would also be possible to set downlink wireless data communication or sidelink wireless data communication.

The invention claimed is:

1. A method for performing wireless data communication between a first device and a second device, comprising:
   transmitting an outgoing radar signal by the first device in a frequency range at least partially overlapping with a frequency range used by the first device for wireless data communication;
   determining, by the first device, a receive property of an incoming radar signal which is associated with the outgoing radar signal, the receive property being indicative of a local environment of the first device; and
   setting at least one parameter for performing the wireless data communication by the first device based on the receive property of the incoming radar signal, wherein setting the at least one parameter takes the local environment into account.

2. The method of claim 1, wherein the at least one parameter comprises a transmit power of the wireless data communication.

3. The method of claim 2, wherein setting the transmit power effects a reduction of the transmit power, which may be achieved by a) lowering the transmit power to remain below a certain level and/or b) using fewer resources in frequency domain and/or c) using fewer resources in time domain.

4. The method of claim 1, wherein the at least one parameter comprises a beam sweep configuration of a beam sweep for determining a spatial propagation path of the wireless data communication.

5. The method of claim 4, further comprising:
analyzing a movement profile of an object based on the receive property of the incoming radar signal; and
setting the at least one parameter in accordance with the analyzed movement profile.

6. The method of claim 1, wherein the at least one parameter comprises a spatial propagation path of the wireless data communication.

7. The method of claim 1, wherein the at least one parameter comprises an antenna panel selection.

8. The method of claim 1, wherein the at least one parameter comprises a frequency value $v_{set}$ or a frequency range $\Delta v_{set}$ of the wireless data communication.

9. The method of claim 1, wherein the at least one parameter comprises a transmission protocol of the wireless data communication.

10. The method of claim 1, wherein the receive property comprises the signal level of the incoming radar signal.

11. The method of claim 1, wherein the receive property comprises at least one of the time delay $\Delta t_{radar}$ between reception of the incoming radar signal and transmission of the outgoing radar signal and a Doppler shift $\Delta v_{radar}$ of the incoming radar signal if compared to the outgoing radar signal.

12. The method of claim 1, further comprising:
performing the wireless data communication in accordance with the at least one parameter,
wherein the wireless data communication is from the second device to the first device and/or from the first device to the second device.

13. The method of claim 1, wherein transmitting the outgoing radar signal by the first device and determining the receive property of the incoming radar signal is performed during an interruption of the wireless data communication and/or simultaneously with the wireless data communication.

14. The method of claim 1, wherein the incoming radar signal is a control signal of the wireless data communication.

15. A first device configured to perform wireless data communication with a second device, comprising a control circuitry configured to perform a method comprising:
transmitting an outgoing radar signal by the first device in a frequency range at least partially overlapping with a frequency range used by the first device for wireless data communication;
determining, by the first device, a receive property of an incoming radar signal which is associated with the outgoing radar signal, the receive property being indicative of a local environment of the first device; and
setting at least one parameter for performing the wireless data communication by the first device based on the receive property of the incoming radar signal, wherein setting the at least one parameter takes the local environment into account.

* * * * *